(12) United States Patent
Rosen et al.

(10) Patent No.: US 7,572,378 B2
(45) Date of Patent: *Aug. 11, 2009

(54) RECYCLED IRRIGATION WATER TREATMENT SYSTEM INCLUDING REVERSE OSMOSIS

(75) Inventors: Peter L. Rosen, Costa Mesa, CA (US); Robert D. Hodges, Birch Bay, WA (US)

(73) Assignee: Turf Sentry, Inc., Scottsdale, AZ (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/304,356

(22) Filed: Dec. 15, 2005

(65) Prior Publication Data

US 2006/0091046 A1 May 4, 2006

Related U.S. Application Data

(63) Continuation-in-part of application No. 10/464,330, filed on Jun. 18, 2003, now abandoned, which is a continuation-in-part of application No. 10/022,568, filed on Dec. 13, 2001, now Pat. No. 6,620,329.

(51) Int. Cl.
  *B01D 61/00* (2006.01)
(52) U.S. Cl. .................. 210/652; 210/739; 210/743; 210/747; 210/758; 210/754; 210/806; 405/37
(58) Field of Classification Search .............. 210/85, 210/96, 1, 96.2, 143, 170, 201, 259, 739, 210/742, 747, 202, 749, 754, 758, 764, 806, 210/743, 652; 405/36, 37; 422/125, 122, 422/124

See application file for complete search history.

(56) References Cited

U.S. PATENT DOCUMENTS

| | | | |
|---|---|---|---|
| 4,062,782 A | * | 12/1977 | Kunst et al. ............ 210/500.3 |
| 4,867,192 A | | 9/1989 | Terrell |
| 5,558,775 A | * | 9/1996 | Busch, Jr. ................ 210/638 |
| 5,741,416 A | * | 4/1998 | Tempest, Jr. .............. 210/90 |
| 5,792,336 A | | 8/1998 | Nikolaevsky et al. |
| 5,863,433 A | | 1/1999 | Behrends |
| 5,893,975 A | | 4/1999 | Eifert |
| 5,958,241 A | | 9/1999 | DeBendetto et al. |
| 5,975,800 A | | 11/1999 | Edwards et al. |

(Continued)

OTHER PUBLICATIONS

Internet Document: "Sewage Monitoring", Jennifer M. Larson from LLNL Environmental Report for 1995.*

(Continued)

Primary Examiner—Joseph W Drodge
(74) Attorney, Agent, or Firm—Kenneth P. Glynn, Esq.

(57) ABSTRACT

A process for irrigation involves monitoring reclaimed water, and treating it when necessary. The reclaimed water is tested with monitors to obtain results for water quality characteristics, including: pH; residual chlorine; and, sodium. These results are inputted to a computerized data handling system for data collection, storage and analysis for comparison to predetermined acceptable ranges for water quality characteristic, and to show any deviation from said acceptable ranges. Either alarms are set off or treatment occurs or both, when deviations are observed. Treatment includes a dechlorination system to correct active chlorine, and, optionally, an oxidation system. There is also a reverse osmosis step for reduction of salts, such as sodium. Other monitors may include one or more of hardness; turbidity; alkalinity; conductivity and nitrates.

20 Claims, 3 Drawing Sheets

U.S. PATENT DOCUMENTS

| | | | |
|---|---|---|---|
| 6,054,050 A * | 4/2000 | Dyke | 210/639 |
| 6,117,335 A | 9/2000 | Bender | |
| 6,132,138 A | 10/2000 | Haese | |
| 6,136,186 A | 10/2000 | Gonzalez-Martin et al. | |
| 6,200,466 B1 | 3/2001 | Bender | |
| 6,214,607 B1 | 4/2001 | Logan | |
| 6,607,668 B2 * | 8/2003 | Rela | 210/321.6 |
| 6,620,329 B2 * | 9/2003 | Rosen et al. | 210/739 |
| 6,635,177 B2 * | 10/2003 | Oswald et al. | 210/602 |
| 6,955,765 B2 * | 10/2005 | Rosen et al. | 210/739 |
| 7,404,899 B2 * | 7/2008 | Rosen et al. | 210/652 |

OTHER PUBLICATIONS

Internet Document: "Shortland wastewater treatment plant" brochure; Mar. 31, 2000.*

Internet Document: Managing Sewage Discharges to Inland Waters;, EPA Publication 473 of Dec. 1995, EPA Victoria, 1995.*

Internet Document: Journal Environmental Monitoring, pp. 161-163 by Edward Urbansky et al, Article entitled Ascorbic acid reduction of active chlorine prior to determining mutagenicity of chlorinated natural organic matter (NOM) published 2000.*

Internet Document: "Wastewater Technology Fact Sheet, Dechlorination,", United States Environmental Protection Agency, Office of Water, Washington, D.C., EPA-832-F-00-022, Sep. 2000.*

* cited by examiner

RECYCLED IRRIGATION WATER TREATMENT SYSTEM INCLUDING REVERSE OSMOSIS

REFERENCE TO RELATED PATENT APPLICATIONS

The present application is a continuation-in-part of U.S. patent application Ser. No. 10/464,330, filed on Jun. 18, 2003 now abandoned, entitled "Recycled Irrigation Water Treatment System With Reverse Osmosis" by the same inventors herein, which itself was a continuation-in-part of U.S. patent application Ser. No. 10/022,568, filed on Dec. 13, 2001, entitled "Golf Course Irrigation Water Monitoring And Treatment System" by the same inventors herein, now U.S. Issued Pat. No. 6,620,329, issued on Sep. 16, 2003.

BACKGROUND OF THE INVENTION

1. Field of the Invention

The present invention relates to irrigation of man-made landscaped and/or agricultural areas, such as parklands, playing fields, farmland for produce or flowers, and especially for golf courses. It is particularly useful for these areas when using reclaimed water. More specifically, the invention is a process for monitoring and treating reclaimed water to use reclaimed water efficiently and without harmful effects from undesirable constituents for the aforesaid irrigation purposes. It includes monitoring numerous water quality characteristics and when predetermined acceptable parameter ranges see deviations, signaling alarms and/or treating the undesirable condition with dechlorination. It also includes oxidation and reverse osmosis system for continuous or continual operation.

2. Information Disclosure Statement

The following patents are representative of the state of the art with respect to various teachings relating to water treatment:

U.S. Pat. No. 6,214,607 describes a new method of treating water to remove perchlorate contaminant is disclosed. Water is fed through a filter bed containing perchlorate-reducing microorganisms. The microorganisms reduce the perchlorate, thereby decontaminating the water. An oxidizable substrate serves as an electron donor to the microorganisms. The invention results in safe to undetectable levels of perchlorate in the treated water.

U.S. Pat. No. 6,200,466 describes a reactor system for decontamination of water by photolytic oxidation utilizing near blackbody radiation, the system comprising (1) a reaction chamber defining an internal space with an inlet and an outlet; and (2) a broadband radiator for generating radiant energy with wavelengths between about 150 nm and about 3 µm, the broadband radiator disposed within the reaction chamber, such that a sufficient dosage of broadband radiation irradiates the contaminants and/or the oxidant within the internal space of the reaction chamber thereby causing photolytic oxidation of the contaminants by direct action of the radiation on the contaminants to break chemical bonds by sustaining a free radical chain reaction of oxidizing components, thus breaking down the contaminants by way of atomic abstraction of the components of the contaminants. In preferred embodiments, at least a portion of the radiant energy is generated in a pulsed node, such as between about 1 and 500 pulses per second. In preferred embodiments, the broadband radiator generates radiant energy at a rate of between about 1 kW and about 10 MN, and the resultant dosage rate of broadband radiation is between 1 joule/cm2. In preferred embodiments, the radiant energy is produced by at least one gas filled flashlamp having a gas plasma temperature of between about 9,500 K and about 20,000 K.

U.S. Pat. No. 6,136,186 describes a method and apparatus for mineralizing organic contaminants in water or air provides photochemical oxidation in a two-phase boundary system formed in the pores of a TiO2 membrane in a photocatalytic reactor. In the three-phase system, gaseous (liquid) oxidant, liquid (gaseous) contaminant, and solid semiconductor photocatalyst meet and engage in an efficient oxidation reaction, The porous membrane has pores which have a region wherein the meniscus of the liquid varies from the molecular diameter if water to the of a capillary tube resulting in a diffusing layer that is several orders of magnitude smaller than the closest known reactors. The photocatalytic reactor operates effectively at temperature and low pressures. A packed-bed photocatalyst coated particles is also provided.

U.S. Pat. No. 6,132,138 describes a gray water recycling invention that utilizes filtered gray water for maintaining constant moisture levels in building foundations and for other irrigation uses. It allows for the mixture of pesticides with a gray water stream injected under a building in order to treat for insects. Additionally, pesticides, fungicides or fertilizers can be injected into a gray water stream prior to its application in landscape irrigating. This invention has application in single residence and fill development real estate settings.

U.S. Pat. No. 6,117,335 describes a reactor system for decontamination of water by photolytic oxidation utilizing near blackbody radiation, the system comprising (1) a reaction chamber defining an internal space with an inlet and an outlet; and (2) a broadband radiator for generating radiant energy with wavelengths between 150 nm and about 3 µm, the broadband radiator disposed within the reaction chamber, such that a sufficient dosage of broadband radiation irradiates the contaminants and/or the oxidant within the internal space of the reaction chamber thereby causing photolytic oxidation of the contaminants by way of atomic abstraction of the components of the contaminants. In preferred embodiments, at least a portion of the radiant energy is generated in a pulsed mood, such as between 1 and about 500 pulses per second. In preferred embodiments, the broadband radiator generates radiant energy at a rate of between about 1 kW and about 10 MW, and the resultant dosage rate of broadband radiation is between 1 joule/cm$^2$ and about 5000 joules/cm$^2$. In preferred embodiments, the radiant energy is produced by at least one gas filled flashlamp having a gas plasma temperature of between 9,500° K. and about 20,000° K.

U.S. Pat. No. 5,975,800 relates to a method for treating groundwater in situ in rock or soil. An elongate permeable upgradient zone and an elongate permeable downgradient zone, each in hydraulic communication with a permeable subsurface treatment zone and having a major axis parallel to a non-zero component of the general flow direction, are provided in the subsurface by any of a number of construction methods. The upgradient zone, downgradient zone, and treatment zone are situated within the subsurface medium and have permeabilities substantially greater than the adjacent subsurface medium's permeability. Groundwater is allowed to move from the subsurface medium adjacent to the upgradient zone into the upgradient zone, where the groundwater refracts and moves to a treatment zone by an in situ treatment process, such as a process employing air sparging, sorption or reaction with zero-valent iron, the groundwater moves into, through and out of the downgradient zone into the subsurface medium adjacent to the downgradient zone. The method does not require pumping. A method for directing groundwater around a particular location to prevent contamination of the groundwater by a contaminant located at the particular location, to prevent migration of a contaminant located at a particular location, to reduce the flow velocity of groundwater in the particular location, or to increase the residence time in an in situ treatment center located downgradient from the particular location is also disclosed.

U.S. Pat. No. 5,958,241 describes a method and a system for the treatment of organic hazardous wastes from plant waste and associated wastewater treatment processes, whereby the waste is either introduced directly, or continuously separated from wastewater, and routed to a bioreactor, and whereby no organic solids are generated for further off-site disposal. The system disclosed includes a bioreactor, containing selected bacteria, untreated sludges, and recirculated biomass, and a liquid/solid separator allowing water to be utilized elsewhere in the system and returning solids to the bioreactor. The biodegradation process, initiated continuously, converts hazardous organic constituents in waste stream and wastewater sludges from plant operations to inert materials, for extensive periods of operation, without the need for solids removal, external solids treatment or disposal.

U.S. Pat. No. 5,893,975 treats a variety of flowing wastewater effluents, provides pre-treatment clog-reducing wastewater sludge disintegration, and adds pretreatment nutrients to wastewater so as to enhance microbial growth therein for improving the effectiveness and efficiency of wastewater treatment. The constructed wetland includes a wastewater treatment system having a flow intake, a pre-treatment nutrient addition chamber, and a wastewater flow divider. The flow divider further has a compressed air aerator in the bottom thereof. The constructed wetland includes one or more treatment cells having a soil, fine stone, organic and/or synthetic material substrate cap covering a further substrate media accommodating the wastewater to be treated. The substrate cap is populated by natural plants having root systems extend from the substrate downward into the wastewater being treated, and the roots serve to physically and/or biologically mediate the removal of undesirable components from the wastewater. The constructed wetland includes a treated water discharge conduit for discharging the flowing water into a desired after treatment water utilization modality, such as to discharge to the ground or to a body of water.

U.S. Pat. No. 5,863,433 relates to the design and operation of paired subsurface flow constructed wetlands in which significant improvements in wastewater treatment are possible. These improvements are brought about by coupling paired subsurface flow wetlands and using reciprocation, whereby adjacent cells are sequentially and recurrently drained and filled using either gravity, mechanical pumps, U-tube air-lifts and/or a combination thereof. This fill and drain technique turns the entire wetland area into a biological reactor, complete with anoxic, anaerobic environments. The frequency, depth and duration of the fill and drain cycle can be adjusted to control redox conditions for specific biologically mediated reactions including, but not limited to, nitrification, denitrification, sulfate reduction, and methanogenesis. Emissions of noxious gases such as hydrogen sulfide and methane can be minimized. Furthermore, by allowing cells to fill to above the level of the substrate by approximately 2 to 4 inches on the fill cycle, it is possible to enhance algae photosynthesis, increase pH, and facilitate photo-oxidative reactions.

U.S. Pat. No. 5,792,336 describes a two stages electrocatalytic method for oxidative-purification of wastewater from soluble substances, such as toxic chemical admixtures difficult of oxidation, including dye-stuffs, detergents, phenols, cyanides and the like, which stages inactivate the soluble substances present in the wastewater in a synergistic fashion and, therefore, are highly efficient, the method comprising the steps of (a) in a first stage, electrochemically treating the wastewater in the presence of chlorine ions, such that chlorine-containing oxidizing agents are formed and at least partially oxidize the soluble substances in the wastewater; and (b) in a second stage, catalytically treating the first stage treated wastewater in presence of a non-chlorine oxidizing agent and an added catalyst, such that remains of the soluble substances are further oxidized, and such that the chlorine-containing oxidizing agents formed during the first stage are catalytically reduced; wherein, the first stage and the second stage act synergistically to purify the wastewater from the soluble substances.

U.S. Pat. No. 4,867,192 describes an automatically controlled irrigation water pH amendment system and apparatus associated with golf courses utilizing automatic irrigation system to irrigate the various species of turf grasses used on fairways, tees, greens and other areas; being adapted to receive an operator pre-selected program of desired irrigation water pH value; to monitor the delivered pH value of the irrigation water and automatically blend into the irrigation water in the flow circuit between the discharge of the irrigation pump station pumps and the pH monitoring point the proper amount of chemical additive to amend—raise or lower—the pH of the delivered irrigation water. The desideratum is a uniformly blended mixture of liquid acid or base chemical with irrigation water to maintain a solution of the water pH value desired by the operator to promote proper agronomic practice in the maintenance of the turf grasses. This objective has been found to be obtainable by causing the two liquids to be blended in the proper ratios through the use of an acid tank, pH sensing probe, sulfuric acid injector pumps, acid manifold, booster pump, flow velocity measuring device, and a solid-state electrical programmable controller; connected to the upstream and downstream ports of an ordinary pressure sustaining valve or differential pressure orifice device as used in the discharge line of a golf course pumping station.

Notwithstanding the prior art, the present invention is neither taught nor rendered obvious thereby.

SUMMARY OF THE INVENTION

The present invention is a process for the irrigation of man-made landscaped areas, including golf course greenery, utilizing reclaimed wastewater. In the process, a source or supply of reclaimed water is procured which is selected from the group consisting of treated sewage wastewater, untreated sewage wastewater and natural water supply water containing sewage wastewater. The reclaimed water is subjected to a plurality of monitors for testing to obtain a plurality of test results for water quality characteristics, that include: (i) pH; (ii) residual chlorine; and (iii) sodium. Optionally, either total organic compounds or chlorides may also be included. These monitors are sometimes referred to as analyzers, and the two terms are used herein interchangeably. The test results or analyzer results are inputted to a computerized data handling system for data collection, storage and analysis and for comparison to predetermined acceptable ranges for each of the aforesaid water quality characteristics.

Feedback is provided to show any water quality characteristic deviating from predetermined acceptable ranges that effect signaling and/or treatment. Feedback is also provided to enable a maintenance keeper or other grounds personnel or service to determine fertilization requirements. In general, the deviation feedback effects or causes an action that is one or more actions selected form the group consisting of sounding an alarm, automatically initiating treatment of the reclaimed water, manually initiating treatment of said reclaimed water, and automatically shutting down the system.

After monitoring, the reclaimed water is then passed through a dechlorination system and, optionally, in addition, part or all of the flow is treated with reverse osmosis (R.O.) to reduce dissolved solids in particular sodium.

The dechlorination system is for treating the reclaimed water with a dechlorination agent to maintain a level of residual chlorine below a predetermined maximum of a predetermined acceptable range, and is activated in response to feedback from the computerized data handling system when showing deviation from the predetermined acceptable range for residual chlorine.

In the event that optional organic compound monitoring and treatment is included in the process, an oxidation system will be included.

The oxidation system is for treating the reclaimed water with an oxidizing agent to maintain a level of organic compounds below a predetermined maximum of the predetermined acceptable range. In essence, the oxidizing system is used to destroy undesirable organics, including biological organisms, herbicides and pesticides. It is activated on a continuous or continual basis and could be adjusted by appropriate personnel in response to feedback from the computerized data handling system when showing deviation from the predetermined acceptable range for total organic carbon compounds. In preferred embodiments, it is run on a continuous basis automatically.

A. The primary goal of treatment of part of the irrigation water with reverse osmosis is for the control of total dissolved solids, (TDS), in particular the metal sodium (Na). By virtue of the reclaimed waters prior use, it may contain very high levels of TDS such as Na, Cl, $SO_4$, and many other components. Turf grasses have varying degrees of sensitivity to soluble salts depending on numerous factors such as soil type, turf grass type, salt concentration, chemical composition of the salt, and many other factors. Generally it is preferred to reduce TDS levels, in particular Na, normally it is preferred to treat part of the irrigation flow in order to control the Na level within site specific parameters. The high pressure membrane system known as reverse osmosis (RO) is useful to reduce salts and is used in our treatment process for this purpose. The RO system is operated and controlled using the computer system acting with feed back from the water quality monitoring system.

The resulting treated reclaimed water is next used to irrigate a golf course area, unless there is a deviation from one of the water quality characteristics being monitored which causes an alarm to signal, in which cause personnel will shut down the irrigation and take corrective measures, such as by-pass, treat, hold or recycle.

The predetermined acceptable ranges are set in accordance with safe use conditions prescribed or desired by the user. In some preferred embodiments, these characteristic parameters are set within the following ranges:

(i) for residual chlorine, 0 milligrams per liter to 1 milligrams per liter;
(ii) for pH, 6 to 8; and
(iii) for sodium, 0 milligrams per liter to 70 milligrams per liter, is preferred, however the sodium concentration may also be in the range of 70 to 1000 mg/l under the control of a turf management plan.

For optional organic compound treatment or optional chloride compound treatment characteristic parameters are set within the following ranges:

(iv) for total organic carbon compounds, 0 milligrams per liter to 50 milligrams per liter; and,
(v) for chloride compounds, 0 milligrams per liter to 70 milligrams per liter.

In some embodiments, the data obtained in the process of the present invention by the computer from the monitors is utilized to provide control and assessment of turf and plant fertilizer needs. Also, the data may be logged and stored to create an historical base and the data may be reviewed or presented to establish water quality trends.

In some preferred embodiments, the process includes at least one additional monitor to obtain test results selected from the group consisting of the following water quality characteristics:

(vi) hardness; (vii) turbidity; (viii) alkalinity; and (ix) conductivity.

In some preferred embodiments, all of these four water quality characteristics are included.

In some preferred embodiments, the process predetermined acceptable ranges for the following water quality characteristics are set within the following ranges:

(vi) for hardness, 0 to 200 milligrams of calcium carbonate per liter;
(vii) for turbidity, 0 to 10 nephelometric turbidity units;
(viii) for alkalinity, 0 to 200 milligrams per liter total alkalinity; and
(ix) for conductivity, 0 to 4000 microSiemens per centimeter.

As mentioned, the process of the present invention computerized data handling system provides feedback to show any water quality characteristic deviation, and the process includes initiating an alarm selected from the group consisting of audio alarms, visual alarms and combinations thereof, when selected characteristic deviations occur. Thus, the alarm (s) would signal in response to deviations for pH, residual chlorine or sodium, and for hardness, alkalinity, turbidity and conductivity and optional TOC or chloride compounds when monitors are included for these characteristics. For example, the alarm system may include direct contact alarm signaling to a groundskeeper superintendent or other facility manager.

In the most preferred embodiments of the present invention, the process is one wherein the dechlorination system is a vitamin C dechlorination system wherein vitamin C agent is fed into the reclaimed water in response to the computerized data handling system showing a deviation from the predetermined acceptable range for residual chlorine.

Also, in those embodiments of the present invention that include organic compound treatment, the process is one wherein the oxidation system is ozone, where in ozone is fed into the reclaimed water at the rate established by the TOC monitor output. In this embodiment hydrogen peroxide is fed at the ozone reactor to further promote oxidation.

Also in the most preferred embodiment of the present invention the process is one wherein the Sodium removal system is a reverse osmosis (RO) system where sodium is removed by a high pressure membrane system. In this embodiment sodium is monitored and the feedback is used to control the RO operations.

In some embodiments of the present invention process, a nitrate monitor is included and preferably, the predetermined acceptable ranges for nitrate are set within the range of 0 to 100 milligrams per liter nitrate as nitrogen.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

The present invention relates to irrigation of man-made or man kept greenery, such as ball fields, parks, agricultural areas, farmland and horticulture areas, driving ranges, and golf course areas to maintain greenery and plantlike. Fairways, greens and surrounding plantlike and other greenery are more efficiently irrigated with reclaimed or recycled water. Otherwise, irrigation would be prohibitively expensive and would involve inefficient use of precious potable water. Many ball parks, fields, country clubs and public golf courses utilize reclaimed water to irrigate their facilities. Such reclaimed water is sewage wastewater which has been treated or untreated (as by negligence, accident or defiance of applicable laws and ordinances) and may come from a municipal, county or other government operated or privately operated treatment facility, or may come from a natural water source, such as a stream, river or other water source into which treated and/or untreated sewage wastewater has been dumped. These reclaimed water sources provide essential irrigation water, but sometimes contain undesirable, harmful components, such as biologically harmful nematodes, pesticides, fungicides and other organics, chlorine, excess nitrogen and excessive minerals. These and other water quality characteristics, such as turbidity, pH, alkalinity and hardness, may either cause or be indicative of components, which cause harm and even death to vegetation such as grass and plants. For these reasons, the present invention has been developed to both treat undesirable reclaimed water constituents and/or set of alarm(s) to signal to maintenance to shut down or correct problems before the reclaimed water is used for irrigation. One critical feature of the present invention is to collect data and to establish predetermined acceptable ranges of water quality characteristics within which the reclaimed water must fall or an alarm or treatment or both will occur. Another critical feature is the automatic initiation and control of dechlorination in response to residual chlorine levels, being outside of predetermined acceptable ranges. In the present invention, the process involves the use of monitors, a computerized data handling system, and a dechlorination system.

Figure 1:
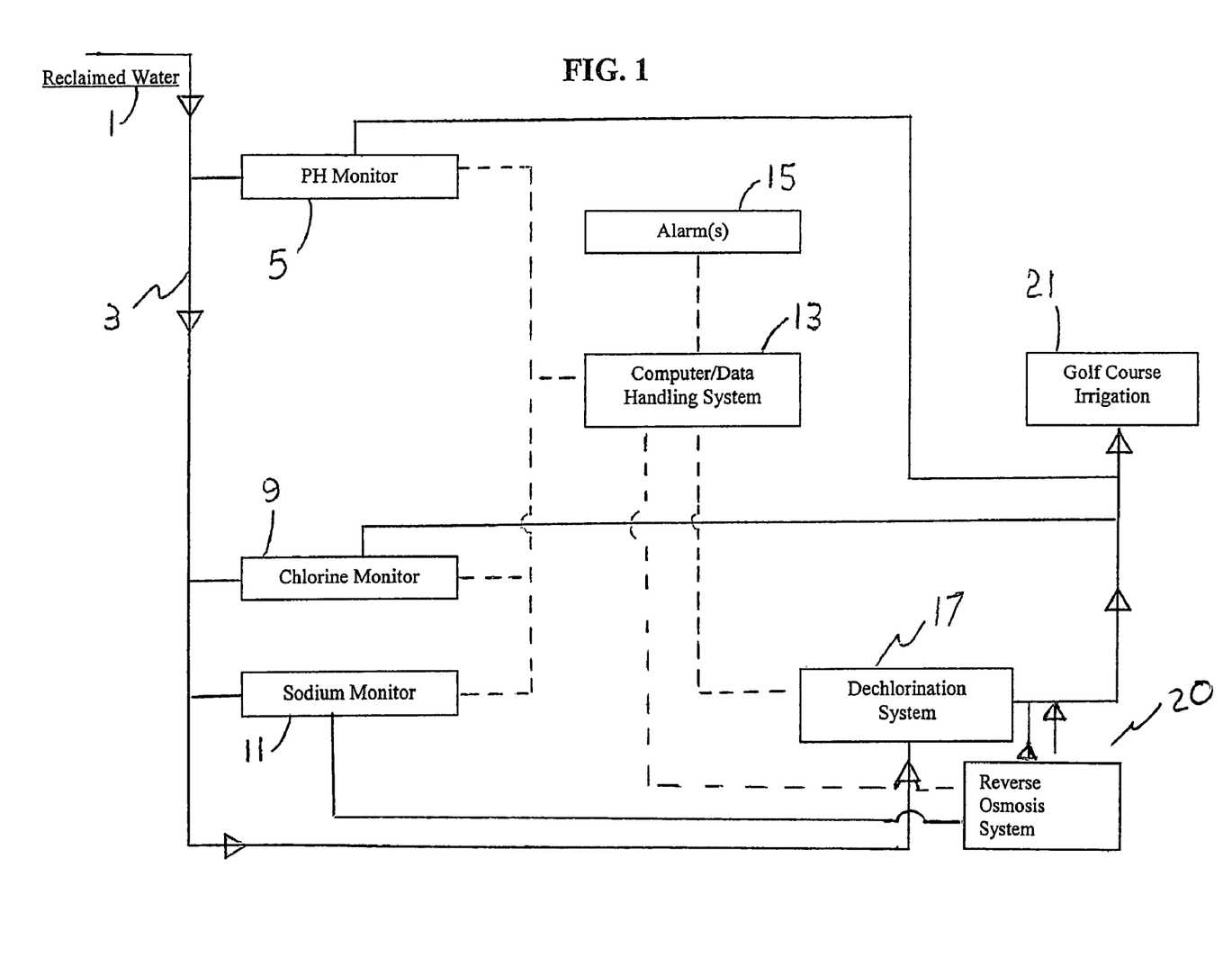
FIGS. 1 and 2 show schematic diagrams for two embodiments of the present invention golf course irrigation system; and, FIG. 3 illustrates the required and optional features of the computerized data handling system used in the present invention golf course irrigation system.

Referring now to FIG. 1, there is shown a schematic representation of one embodiment of the present invention. In FIG. 1, reclaimed water form any one or more of the sources mentioned above is piped into a golf course facility via piping 3. A pH monitor 5, a residual chlorine monitor 9 and a sodium monitor 11 are connected to piping 3 for testing/monitoring of those water quality characteristics. The residual chlorine monitor (analyzer) could be two different units or a single unit. However, chloride compound water quality characteristic may be used for a shutdown determination, whereas the active chlorine water quality characteristic may be used for an automatic interactive treatment, i.e. dechlorination. The aforesaid monitors are electronically connected to computer/data handling system 13 for input thereto of monitor tests results from the reclaimed water stream of piping 3. Alternatively, these monitors (and others described below) could be connected to a holding tank, a pond or other natural waterway or other manmade holding facility, for testing. The details of the functionality of a preferred present invention computer/data handling system 13 are set forth in conjunction with FIG. 3 below.

In general, the computer/data handling system (CDHS) 13 has three primary objectives: (a) it collects and stores data and retains predetermined acceptable ranges (criteria) for the data and compares the data to the criteria; (b) it sets off one or more alarms 15 when the pH, the residual chloride, or the sodium readings (or other optional water quality characteristics readings described below) deviate from predetermined criteria, i.e., set ranges, such as, hypothetically, 0 to 2500 mg/l or 5 to 7; and (c) it initiates automatic treatment when the residual chlorine or the TOCs exceed acceptable criteria.

Thus, piping 3 is connected to dechlorination system 17 for treatment at the desired times, i.e. as needed, when determined by the computer/data handling system 13. The CDHS 13 receives the data from the monitors and when the residual chlorine is excessive, it initiates the dechlorination system 17. A portion of the reclaimed water is then moved through the reverse osmosis system 20 and returned to the main flow. Reverse osmosis system 20 is connected to sodium monitor 11 and computer/data handling system 13 so that the reverse osmosis system 20 is continuously, periodically or occasionally utilized to reduce sodium content, as and when needed to meet the target ranges set forth above for sodium. The adjusted (treated) reclaimed water is then sent to a conventional golf course irrigation system 21, such as automatic sprinklers, etc. As an extra precaution, residual chlorine monitoring and pH monitoring may be also conducted post-dechlorination to confirm that levels remain within acceptable ranges after treatment. If these post-treatment monitorings show unacceptable results, then adjustments may be included in the programming, or alarms or shutdowns may be proscribed, depending upon the facilities, system and risk management of the user.

Figure 2:
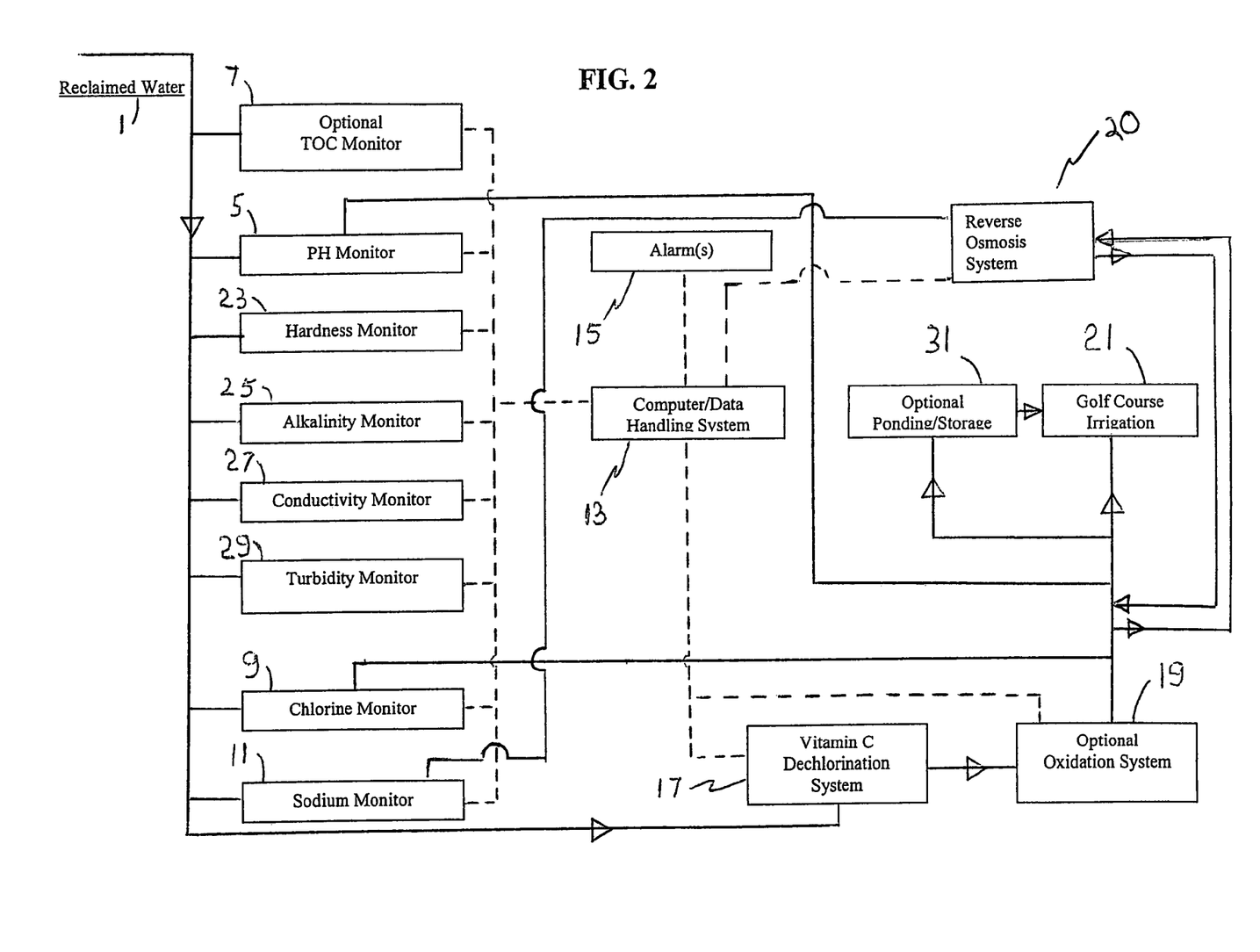

FIG. 2 shows another present invention system with more options and preferred details. Here items identical to those shown in FIG. 1 are identically numbered, and, to the extent that they are not further described here, function as described here conjunction with FIG. 1 above. In FIG. 2, additional monitors have been included. These are the optional TOC monitor 7, hardness monitor 23, alkalinity monitor 25, conductivity monitor 27 and turbidity monitor 29. They are connected to the piping 3 for reclaimed water analysis and, when excessive are alarm initiation water quality characteristics. All of these monitors, any one of these or any combination of these, could be included within the scope of the present invention, and FIG. 2 represents only one preferred embodiment.

In FIG. 2, optional oxidation system 19 is also included, as described above. Optional nitrate monitor 10 is also included. Additionally, a portion of the reclaimed water maybe moved through the reverse osmosis system 20 and returned to the main flow. Reverse osmosis system 20 is connected to sodium monitor 11 and computer/data handling system 13 so that the reverse osmosis system 20 is continuously, periodically or occasionally utilized to reduce sodium content, as and when needed to meet the target ranges set forth above for sodium.

In FIG. 2, the dechlorination system is specified as Vitamin C dechlorination, and this is clearly the preferred dechlorination agent. An optional holding pond 31 for storage is also shown downstream from the treatment stage, and upstream from the actual irrigation. In this embodiment, the reclaimed, monitored and treated, as needed water is stored until needed.

Figure 3:
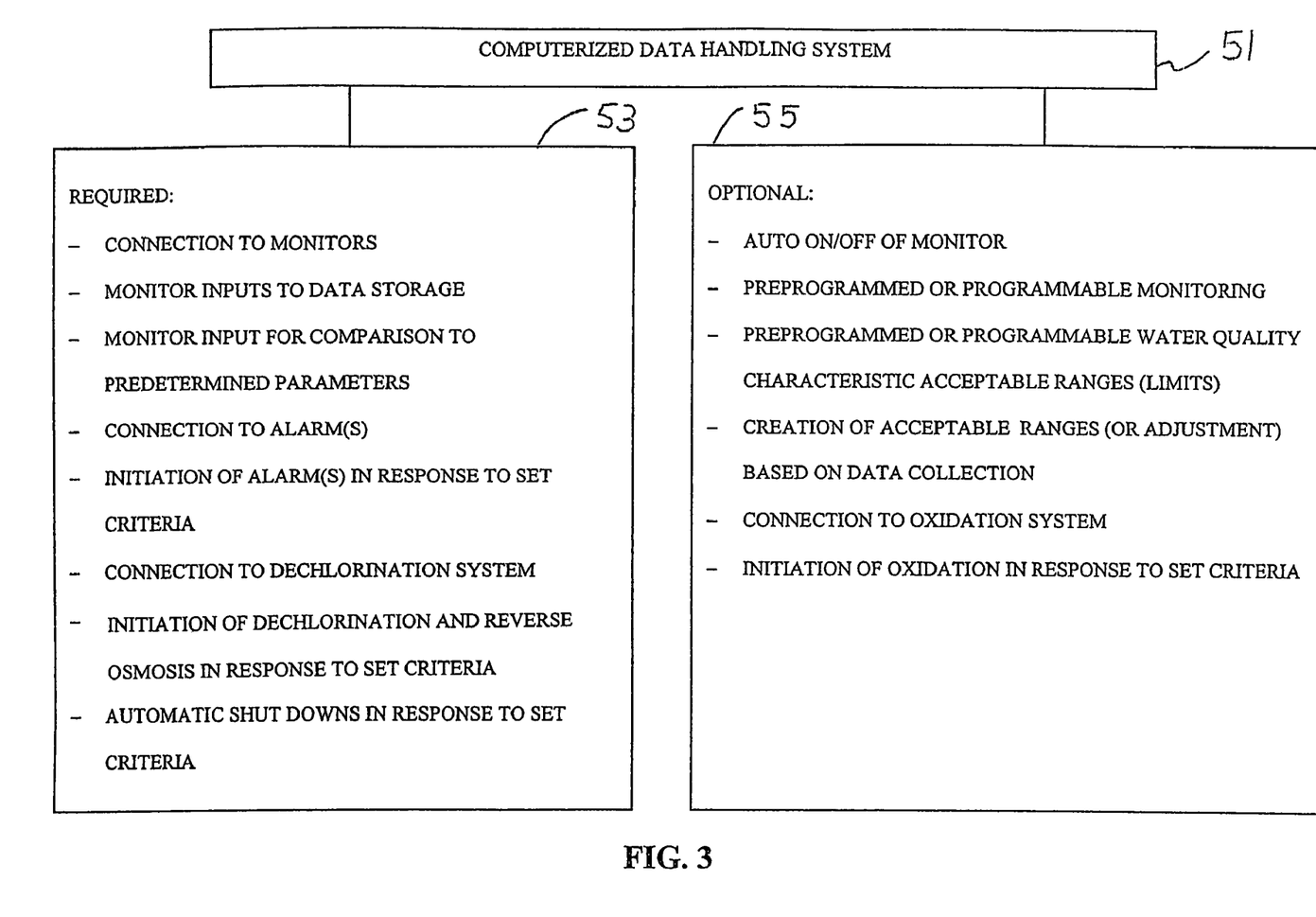

Referring to FIG. 3, the diagram shows the details of the computerized data handling system 51, illustrating required functions 53 and optional functions 55.

EXAMPLE

The system of the present invention shown in FIG. 1 above with the functions shown in FIG. 3 is deployed at a privately owned golf course utilizing ponded (lagooned) municipal wastewater and storm water runoff for the reclaimed water. The municipal wastewater undergoes primary and secondary sludge wastewater treatment before ponding.

The following monitors are included:
(1) pH Monitor—EC 310 Model from Hach Company, measures full range from) 1 to 14.
(2) Hardness Monitor—SP 510 Harness Monitor from Hach Company, measures hardness expressed as ppm, and as mg calcium carbonate per liter.
(3) Alkalinity Monitor—APA Alkalinity Process Analyzer from Hach Company, measures total alkalinity as ppm.
(4) Conductivity Monitor—Model 9782 Conductivity Analyzer from Honeywell Company, measures micromhos and megohms per cm.
(5) Turbidity Monitor—Model 1720D Turbidimeter from Hach Company, measure turbidity in nephelometric turbidity units (NTU), with a 0 to 100 range and 0.001 resolution.
(6) Chloride compound/residual chlorine Monitor—Model CL17 Chlorine Analyzer from Hach Company, measures free (active) chlorine and total chlorine content, range of 0 to 5 mg per liter.
(7) Sodium Monitor—HACH Model 9073 Sodium Analyzer measures soluble sodium, range of 0 to 10,000 PPM.
(8) Nitrate Monitor—APA 6000 Nitrate Analyzer measures soluble nitrates a nitrogen in mg per liter, ppm and ppb.

The system includes post treatment ponding and a conventional irrigation system. As the reclaimed monitor is piped into the system, all of the monitors, either periodically or by preprogrammed schedule, or in some cases, continuously monitor the system. As the reclaimed water passes through with all water quality characteristics measuring within predetermined ranges, the water is simply fed to the holding pond as needed. When the residual chlorine exceeds the desired range, the dechlorination system is initiated and will run until the readings fall within the acceptable range. As a precaution, post treatment readings are also taken and, if unfavorable, the computer may increase treatment, signal an alarm, shutdown the flow or some combination thereof. Likewise, in those situations where optional TOC monitoring and treatment are included, when the TOC exceeds its acceptable range, the oxidation system feed rate will be adjusted to increase dosage until the TOC readings fall back into the acceptable range. RO Likewise when the sodium exceeds an acceptable level the RO system is initiated until sodium levels decline to acceptable levels. When any one or more of the other monitored water quality characteristics exceed their acceptable ranges, either an alarm will signal and/or a shutdown will occur. The system results in the avoidance of harmful factors being entered into the irrigation system and damaged and/or destroyed plantlife is eliminated.

Obviously, numerous modifications and variations of the present invention are possible in light of the above teachings. It is therefore understood that within the scope of the appended claims, the invention may be practiced otherwise than as specifically described herein.

What is claimed is:

1. A process for irrigation of man-made landscaped areas, which comprises: (a) procuring a supply of reclaimed water selected from the group consisting of treated sewage wastewater, untreated sewage wastewater and natural water supply water containing sewage wastewater;
   (b) subjecting said reclaimed water to a plurality of monitors and testing said reclaimed water with said plurality of monitors to obtain a plurality of test results for water quality characteristics, including:
      (i) pH
      (ii) residual chlorine; and,
      (iii) sodium;
   (c) inputting said test results to a computerized data handling system for data collection, storage and analysis for comparison to predetermined acceptable ranges for each of said water quality characteristics, and providing feedback to show any water quality characteristic deviating from said acceptable ranges wherein said feedback is one or more selected from the group consisting of sounding an alarm, automatically initiating treatment of said reclaim water, manually initiating treatment of said reclaimed water, and automatically shutting down a treatment system;
   (d) providing a dechlorination treatment system to said reclaimed water for treating said reclaimed water with a dechlorination agent to maintain a level of residual chlorine below a predetermined maximum of said predetermined acceptable range, and activating said dechlorination system in response to feedback from said computerized data handling system when showing deviation from said predetermined acceptable range for residual chlorine;
   (e) subjecting at least a portion of said reclaimed water with a dissolved solid salts treatment system for removal of at least a portion total dissolved solid salts to generate reduced salt reclaimed water;
   (f) irrigating a man-made landscaped area with reclaimed water which has been processed in accordance with the preceding steps; and,
   (g) performing post treatment readings wherein said computerized data handling system automatically shuts down said irrigating when said post treatment readings deviate from acceptable post treatment ranges.

2. The process of claim 1 wherein said plurality of monitors includes at least one additional monitor to obtain test results selected from the group consisting of the following water quality characteristics:
   (a) hardness;
   (b) turbidity;
   (c) alkalinity; and
   (d) conductivity.

3. The process of claim 1 wherein said plurality of monitors includes additional monitors to obtain test results for the following water quality characteristics:
   (e) hardness;
   (f) turbidity;
   (g) alkalinity; and
   (h) conductivity.

4. The process of claim 1 wherein said providing feedback to show any water quality characteristic deviation includes initiating an alarm selected from the group consisting of audio alarms, visual alarms and combinations thereof.

5. The process of claim 4 wherein said alarm is initiated in response to feedback showing any deviation from water quality characteristics selected from the group consisting of residual chlorine and sodium.

6. The process of claim 2 wherein said providing feedback to show any water quality characteristic deviation includes initiating an alarm selected from the group consisting of audio alarms, visual alarms and combinations thereof.

7. The process of claim 6 wherein said alarm is initiated in response to feedback showing any deviation from water quality characteristics selected from the group consisting of pH, residual chlorine, sodium, hardness, turbidity, alkalinity and conductivity.

8. The process of claim 1 wherein said dechlorination system is a vitamin C dechlorination system wherein vitamin C is fed into said reclaimed water in response to said computerized data handling system showing a deviation from said predetermined acceptable range for active chlorine.

9. The process of claim 1 wherein said predetermined acceptable ranges are set within the following ranges:
 (i) for residual chlorine, 0 milligrams per liter to 1 milligrams per liter;
 (ii) for pH, 6 to 8; and,
 (iii) for sodium, 0 milligrams per liter to 70 milligrams per liter.

10. The process of claim 9 wherein said plurality of monitors includes at least one additional monitor to obtain test results selected from the group consisting of the following water quality characteristics:
 (vi) hardness;
 (vii) turbidity;
 (viii) alkalinity; and
 (ix) conductivity.

11. The process of claim 10 wherein said providing feedback to show any water quality characteristic deviation includes initiating an alarm selected from the group consisting of audio alarms, visual alarms and combinations thereof.

12. The process of claim 9 wherein said providing feedback to show any water quality characteristic deviation includes initiating an alarm selected from the group consisting of audio alarms, visual alarms and combinations thereof.

13. The process of claim 12 wherein said alarm is initiated in response to feedback showing any deviation from water quality characteristics selected from the group consisting of residual chlorine and sodium.

14. The process of claim 12 wherein said process further includes the following step after step (d):
 (h) providing an oxidation system to said reclaimed water for treating said reclaimed water with an oxidizing agent to maintain a level of total organic compounds below a predetermined maximum of said predetermined acceptable range and to destroy biological hazards, and controlling said oxidation system in response to feedback from said computerized data handling system when showing deviation from said predetermined acceptable range for total organic compounds.

15. The process of claim 14 wherein said dechlorination system is a vitamin C dechlorination system wherein vitamin C is fed into said reclaimed water in response to said computerized data handling system showing a deviation from said predetermined acceptable range for active chlorine.

16. The process of claim 10 wherein said predetermined acceptable ranges for the following water quality characteristics are set within the following ranges:
 (vi) for hardness, 0 to 200 milligrams of calcium carbonate per liter;
 (vii) for turbidity, 0 to 10 nephelometric turbidity units;
 (viii) for alkalinity, 0 to 200 milligrams per liter total alkalinity; and
 (ix) for conductivity, 0 to 4000 microSiemens per centimeter.

17. The process of claim 12 wherein reverse osmosis system to said reclaimed water for treating said reclaimed water is utilized to maintain a level of sodium below a predetermined maximum of said predetermined acceptable range and controlling said reverse osmosis system in response to said feedback from said computerized data handling system when showing said deviation from said predetermined acceptable range for sodium.

18. The process of claim 9 wherein said dechlorination system is a vitamin C dechlorination system wherein vitamin C is fed into said reclaimed water in response to said computerized data handling system showing a deviation from said predetermined acceptable range for active chlorine.

19. The process of claim 9 wherein said plurality of monitors includes a nitrate monitor.

20. The process of claim 9 wherein predetermined acceptable ranges for nitrate are set within the range of 0 to 100 milligrams per liter nitrate as nitrogen.

* * * * *